(12) United States Patent
Arguello, Jr. et al.

(10) Patent No.: US 11,678,963 B1
(45) Date of Patent: Jun. 20, 2023

(54) DEVICE FOR REDUCING AEROSOLS, ISOLATING AEROSOLS, AND REMOVING INTRA ORAL FLUIDS AND DEVICE OR REDUCING AEROSOLS AND REMOVING INTRAORAL FLUIDS

(71) Applicants: Vigarny Alfonso Arguello, Jr., Pompano Beach, FL (US); Werner Segundo Blumenthal, Miami, FL (US)

(72) Inventors: Vigarny Alfonso Arguello, Jr., Pompano Beach, FL (US); Werner Segundo Blumenthal, Miami, FL (US)

( * ) Notice: Subject to any disclaimer, the term of this patent is extended or adjusted under 35 U.S.C. 154(b) by 344 days.

(21) Appl. No.: 17/100,090

(22) Filed: Nov. 20, 2020

(51) Int. Cl.
*A61C 17/12* (2006.01)

(52) U.S. Cl.
CPC .......... *A61C 17/12* (2019.05); *A61C 2204/00* (2013.01)

(58) Field of Classification Search
CPC ......... A61C 17/12; A61C 17/06; A61C 17/10; A61C 17/092
See application file for complete search history.

(56) References Cited

U.S. PATENT DOCUMENTS

| | | | |
|---|---|---|---|
| 5,334,019 A * | 8/1994 | Goldsmith | A61C 3/025 451/100 |
| 6,186,783 B1 * | 2/2001 | Brassil | A61C 17/08 433/91 |
| 10,952,831 B1 * | 3/2021 | Dürrstein | A61C 17/08 |
| 2021/0259817 A1 * | 8/2021 | Kim | A61C 17/08 |
| 2022/0192806 A1 * | 6/2022 | Palumbo | A61C 17/08 |

* cited by examiner

*Primary Examiner* — Heidi M Eide
(74) *Attorney, Agent, or Firm* — Albert Bordas P.A.

(57) ABSTRACT

A device for reducing aerosols and removing intraoral fluid, having an aerosol removal port and an aerosol assist body assembly. The aerosol removal port has an aerosol removal port wall, a lip constriction, and an anchor. The aerosol assist body assembly has a body wall, first and second passages, and a back flow union. The device is a suction device to reduce aerosol dispersion, and removing intraoral fluids.

15 Claims, 15 Drawing Sheets

DETAIL D

DETAIL E

DEVICE FOR REDUCING AEROSOLS, ISOLATING AEROSOLS, AND REMOVING INTRA ORAL FLUIDS AND DEVICE OR REDUCING AEROSOLS AND REMOVING INTRAORAL FLUIDS

BACKGROUND OF THE INVENTION

1. Field of the Invention

The present invention relates to dental devices, and more particularly, to dental devices for removing aerosols, protecting dentists from patient aerosols, and removing intraoral fluids.

2. Description of the Related Art

The prior art describes devices worn by a patient to protect the dentist from being exposed to germ-containing aerosols and fluids from patients. Such personal protection equipment (PPE) includes masks worn by the dentist, visors worn by the dentist, and safety glasses worn by the dentist. Applicant is not aware of any device for reducing aerosols and removing intraoral fluid having the novel features of the present invention.

SUMMARY OF THE INVENTION

The present invention is a device for reducing aerosols and removing intraoral fluid, comprising an aerosol removal port and an aerosol assist body assembly.

The aerosol removal port comprises an aerosol removal port wall and an anchor. The aerosol assist body assembly comprises a body wall and first and second passages. The aerosol removal port further comprises an aerosol entrance port rim, a lip constriction, and first and second tabs. The lip constriction defines a waist on the aerosol entrance port rim defining an opening upper portion and an opening lower portion. The opening upper portion comprises a first predetermined size and the opening lower portion comprises a second predetermined size, wherein the first predetermined size is bigger than the second predetermined size. The lip constriction extends onto the aerosol removal port wall from the aerosol entrance port rim toward the body wall. The anchor extends below the lip constriction. The anchor comprises a buccal plate anchor lip constriction. The buccal plate anchor lip constriction is defined between a backside of the anchor and the body wall. The aerosol removal port is narrower from the lip constriction to the buccal plate anchor constriction. The first and second tabs extend one in front of the other from respective internal walls of the lip constriction.

The aerosol assist body assembly further comprises a back flow union, a High Volume Evacuator connector, a body end, and a channel. The back flow union comprises a ridge. The back flow union is connected to the body wall at the body end. The High Volume Evacuator connector is connected to the back flow union, and a High Volume Evacuator is connected to the High Volume Evacuator connector. The first and second passages are separated by an internal wall. The first passage receives a saliva-ejector. The saliva-ejector passes through the first passage and extends outwardly from the aerosol removal port. The saliva-ejector passes through the opening lower portion extending outwardly from the aerosol removal port. The first and second tabs secure the saliva-ejector on the opening lower portion.

The aerosol assist body assembly extends perpendicularly from the aerosol removal port. Aerosol and fluids are sucked from a patient's mouth through the first and second passages. The device is a suction device to reduce aerosol dispersion and removing intraoral fluid.

It is therefore one of the main objects of the present invention to provide a device for reducing aerosols and removing intraoral fluids.

It is another object of this invention to provide a device for reducing aerosols and removing intraoral fluids by suction.

It is another object of this invention to provide a device for reducing aerosols and removing intraoral fluids to assist the practitioner in removal of aerosols.

It is another object of this invention to provide a device for reducing aerosols and removing intraoral fluids comprising a lip anchor that allows a patient to close his or her lips.

It is another object of this invention to provide a device for reducing aerosols and removing intraoral fluids comprising an anchor that allows a patient to use his/her buccinator muscle to keep present invention from rotating or otherwise shifting/moving while in use.

It is another object of this invention to provide a device for reducing aerosols and removing intraoral fluids that is volumetrically efficient for carrying, transporting, and storage.

It is another object of this invention to provide a device for reducing aerosols and removing intraoral fluid that can be readily assembled and disassembled without the need of any special tools.

It is another object of this invention to provide a device for reducing aerosols and removing intraoral fluid, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 13A is the cut view showed in FIG. 12 taken along line 12-12 from FIG. 11, with a cross-sectioned High Volume Evacuator connected.

FIG. 13B is an enlarged view of section D from FIG. 13A.

FIG. 13C is an enlarged view of section E from FIG. 13B.

DETAILED DESCRIPTION OF THE PREFERRED EMBODIMENT

Figure 1:
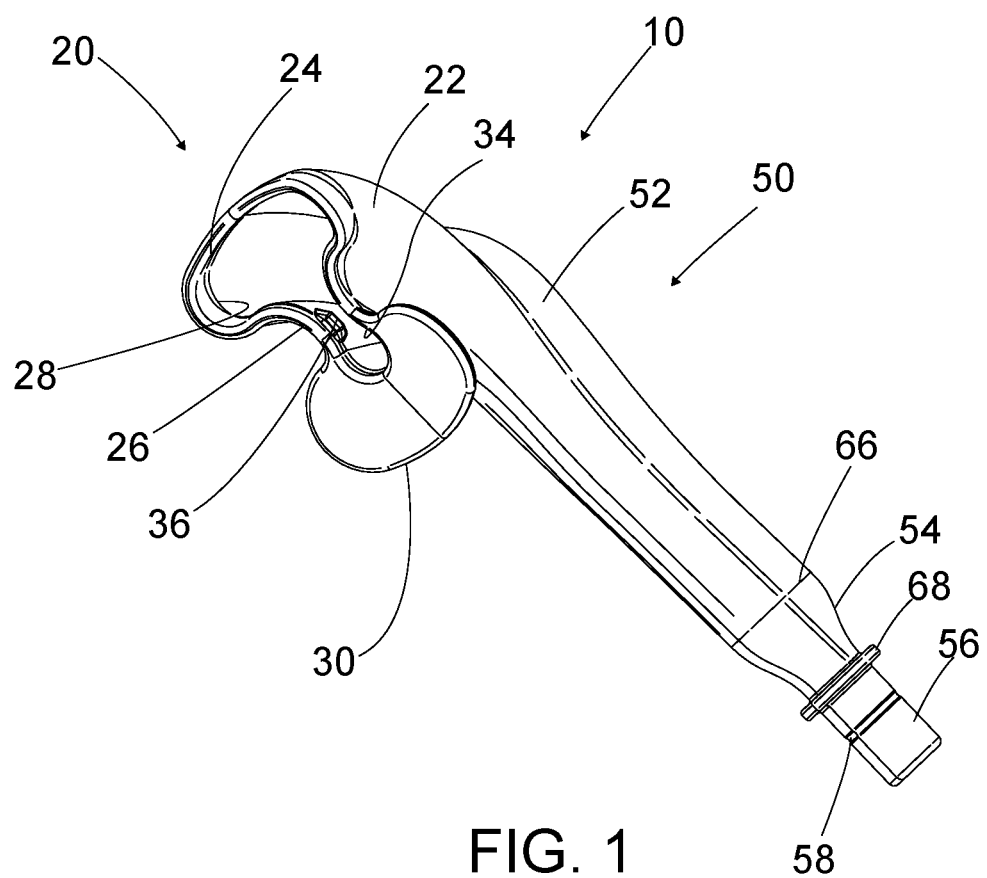
FIG. 1 is a first isometric view of a device for reducing aerosols and removing intraoral fluid according to the present invention.

Referring now to the drawings, the present invention is a device for reducing aerosols and removing intraoral fluid, and is generally referred to with numeral 10. Present invention 10 is sometimes referred to as an "Aerosol Assist" or as a "Stand-Alone Aerosol Assist". It can be observed that it basically includes aerosol removal port 20 and aerosol assist body assembly 50.

Figure 2:
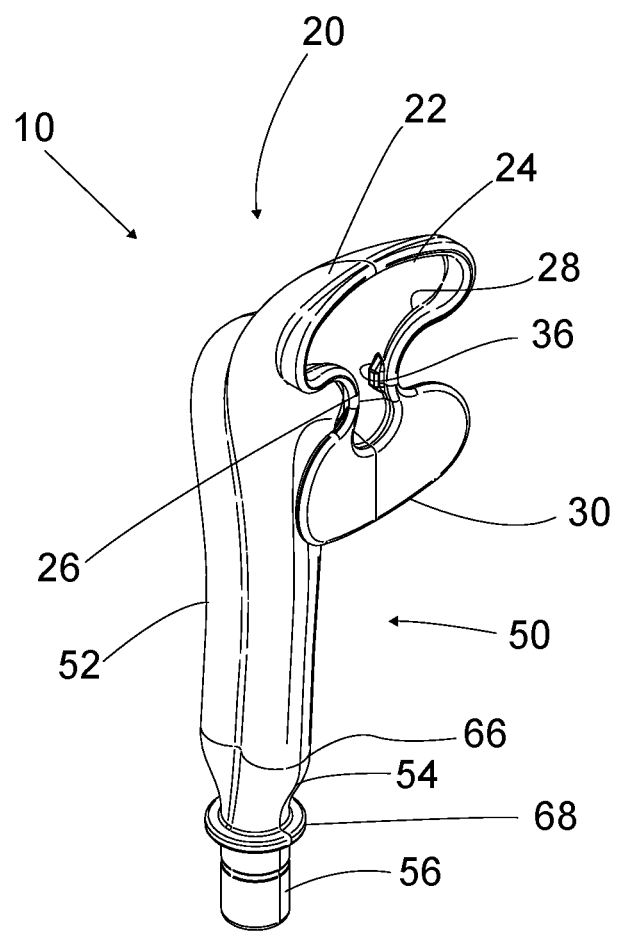
FIG. 2 is a second isometric view of the device of the present invention.
Figure 3:
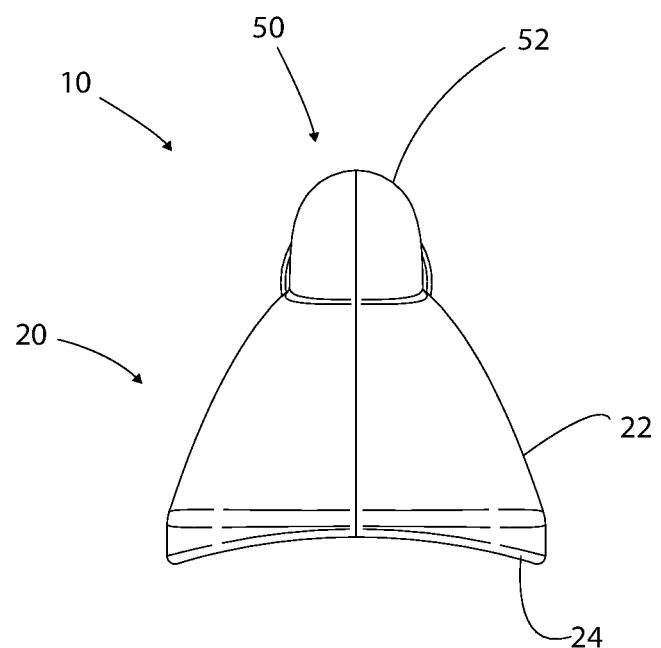
FIG. 3 is a top view of the device of the present invention.

As seen in FIGS. 1, 2, and 3, aerosol removal port 20 comprises aerosol removal port wall 22, aerosol entrance port rim 24, lip constriction 26, and buccal plate anchor 30. Aerosol assist body assembly 50 comprises body wall 52. Lip constriction 26 extends onto aerosol removal port wall 22 from aerosol entrance port rim 24 toward body wall 52. Lip constriction 26 allows easy intentional installation and removal while preventing unintentional removal. Aerosol assist body assembly 50 extends perpendicularly from aerosol removal port 20. Aerosol removal port 20 is narrower from lip constriction 26 to lip anchor 32, seen in FIG. 5.

Figure 4:
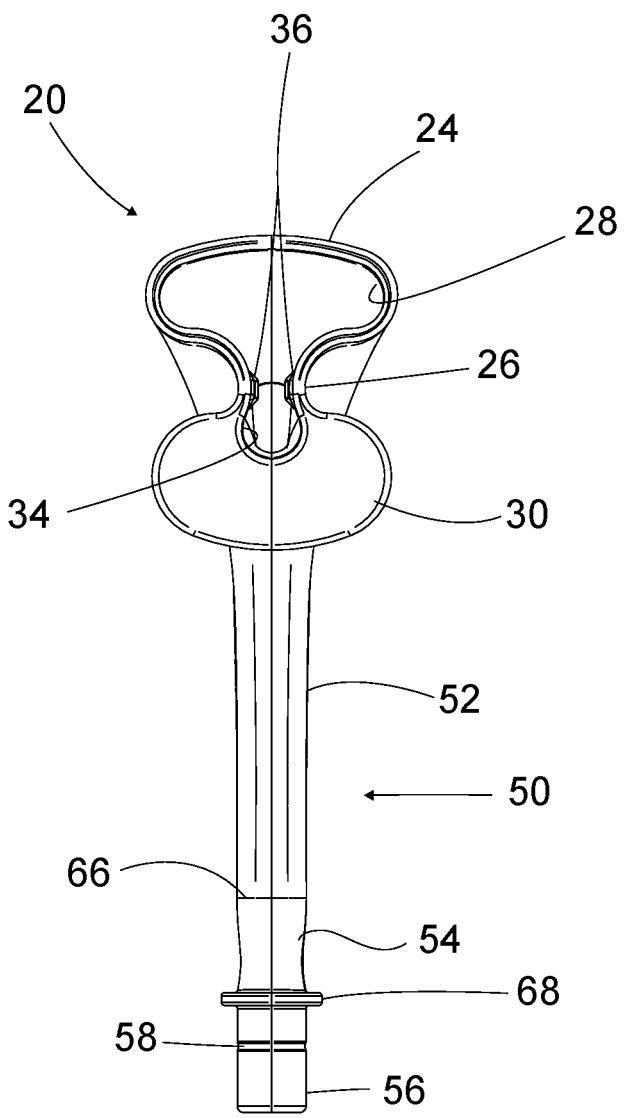
FIG. 4 is a front view of the device of the present invention.

As seen in FIG. 4, buccal plate anchor 30, also defined as an anchor, extends below lip constriction 26. Aerosol removal port 20 further comprises first and second tabs 36. First and second tabs 36 extend one in front of the other from respective internal walls of lip constriction 26. Lip constriction 26 defines a waist on aerosol entrance port rim 24 defining opening upper portion 28 and opening lower portion 34. Opening upper portion 28 comprises a first predetermined size and opening lower portion 34 comprises a second predetermined size. The first predetermined size is larger than the second predetermined size.

Figure 5:
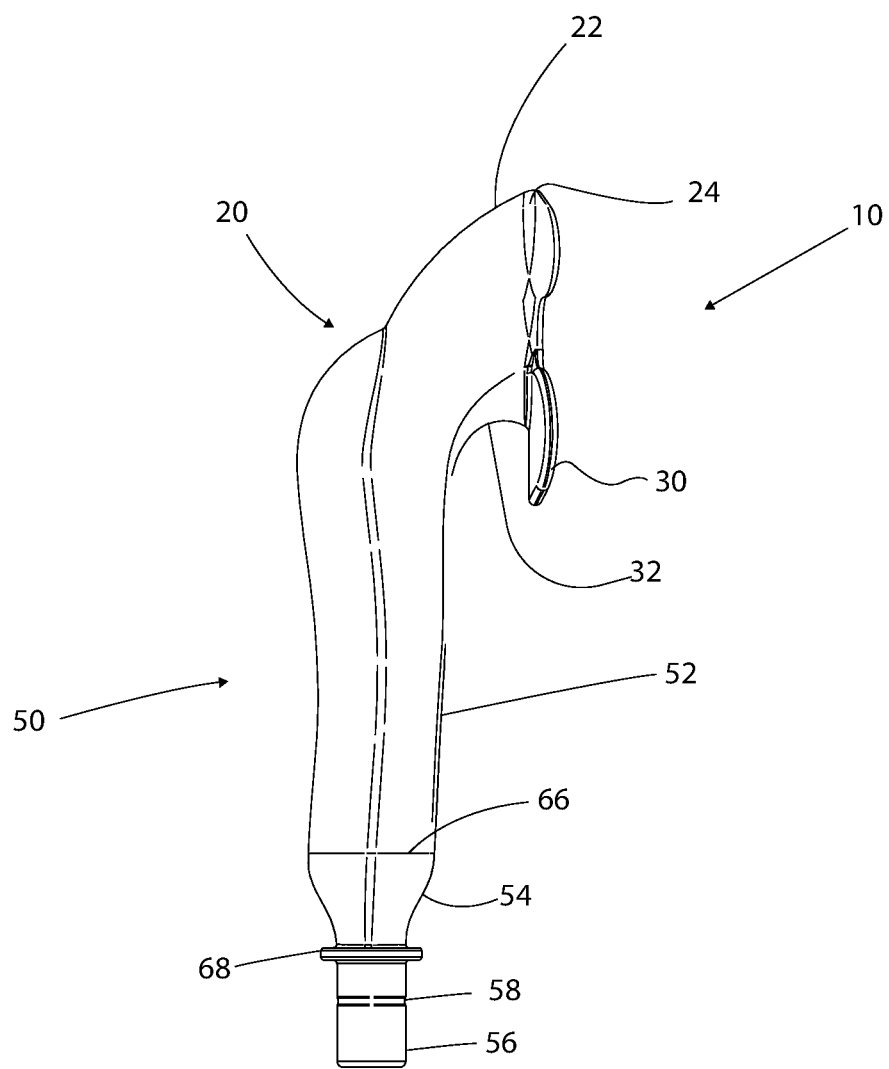
FIG. 5 is a first side view of the device of the present invention.
Figure 6:
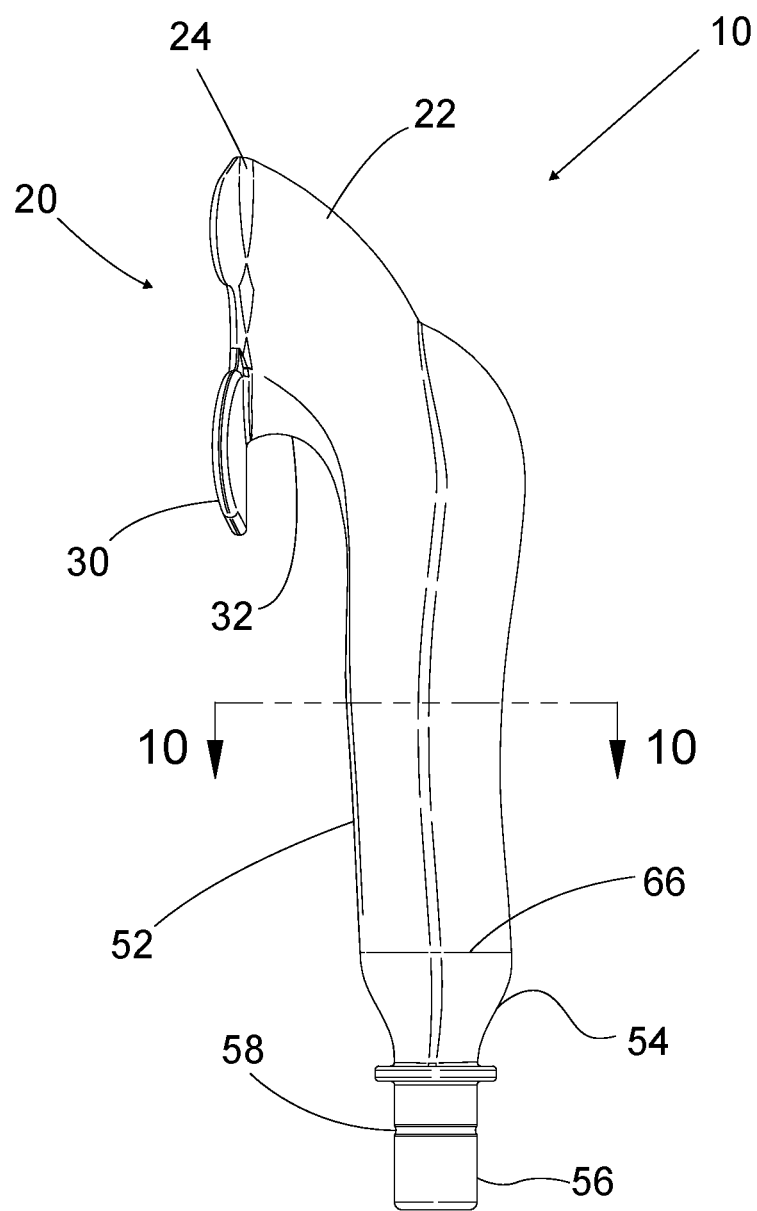
FIG. 6 is a second side view of the device of the present invention.

As seen in FIGS. 5 and 6, buccal plate anchor 30 comprises lip anchor 32. Lip anchor 32 is defined between a backside of buccal plate anchor 30 and body wall 52. Lip anchor 32 provides a surface on which present invention 10 can be hung or rested while is in use. In addition, lip anchor 32 allows a patient to close his or her lips. It is noted that buccal plate anchor 30 allows a patient to use his/her buccinator muscle to keep present invention from rotating or otherwise shifting/moving while in use. Present invention 10 can be used on edentulous, partially endentulous, and maloclusion patients.

Figure 7:
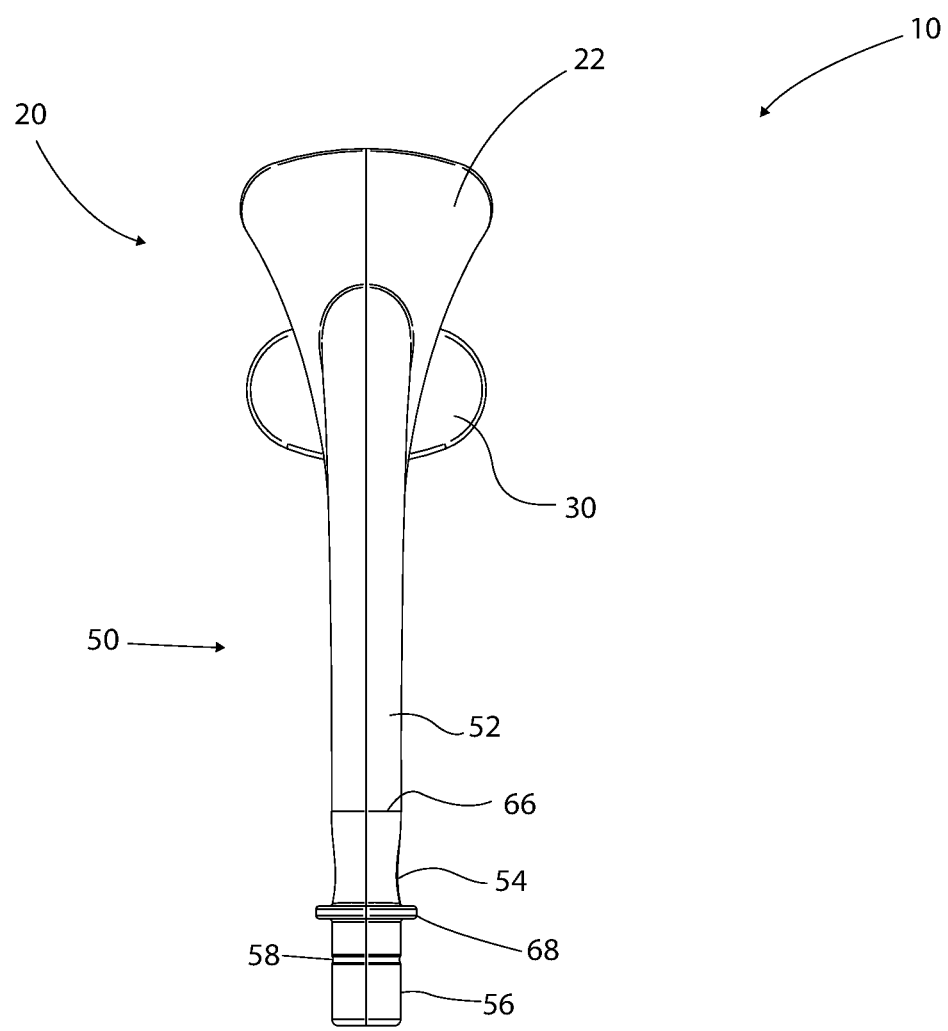
FIG. 7 is a rear view of the device of the present invention.

As seen in FIG. 7, aerosol assist body assembly 50 further comprises back flow union 54, High Volume Evacuator (HVE) connector 56, and channel 58. Body wall 52 has body end 66.

Figure 8:
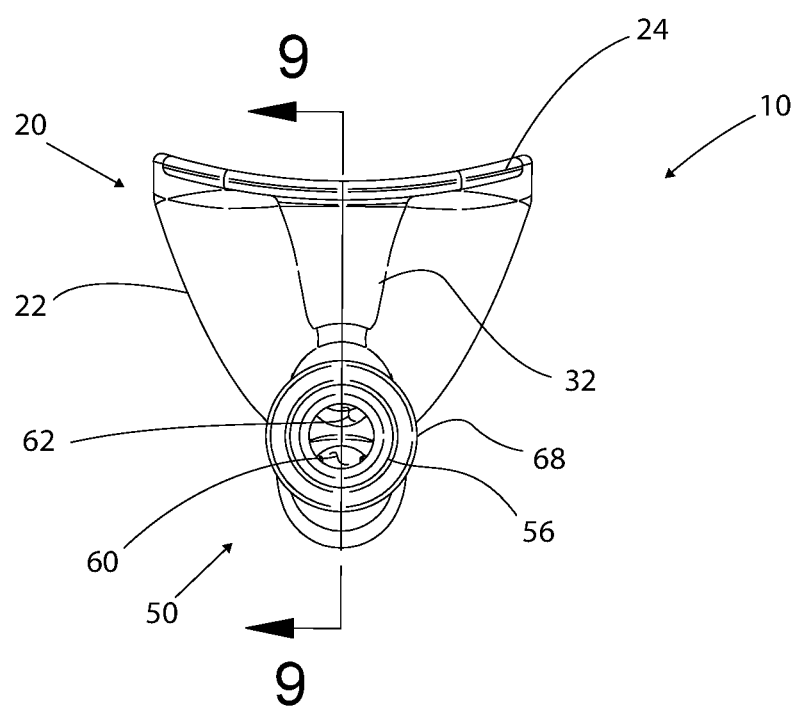
FIG. 8 is a bottom view of the device of the present invention.
Figure 9:
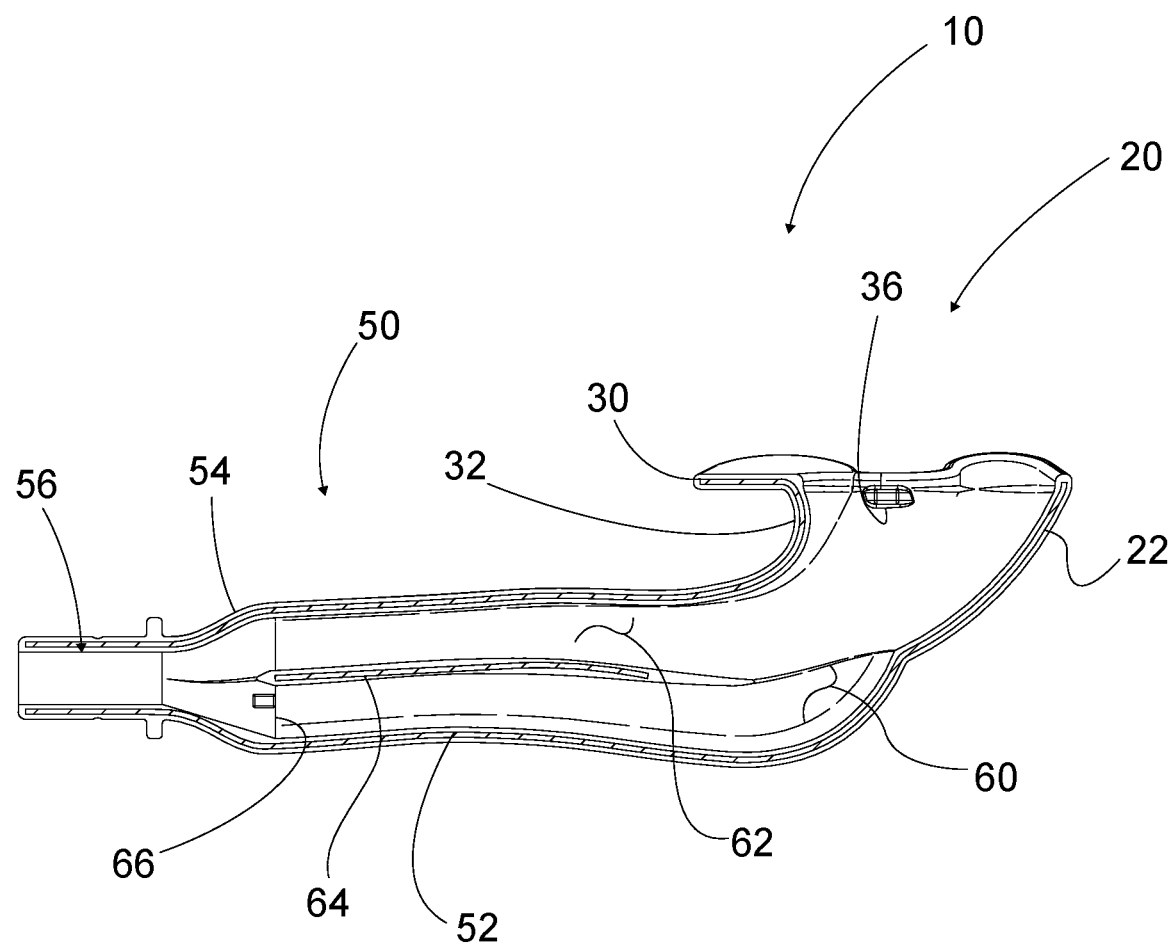
FIG. 9 is a cut view taken along line 9-9 from FIG. 8.
Figure 10:
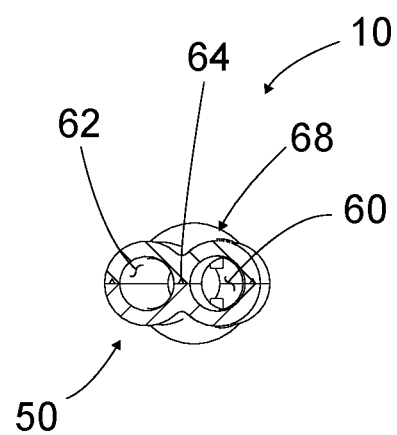
FIG. 10 is a cut view taken along line 10-10 from FIG. 6.

As seen in FIGS. 8, 9, and 10, aerosol assist body assembly 50 further comprises first passage 60 and second passage 62. First passage 60 and second passage 62 are separated by internal wall 64. First passage 60 and second passage 62 connect to aerosol removal port 20. Back flow union 54 is connected to body wall 52 at body end 66. High Volume Evacuator connector 56 is connected to back flow union 54.

Figure 11:
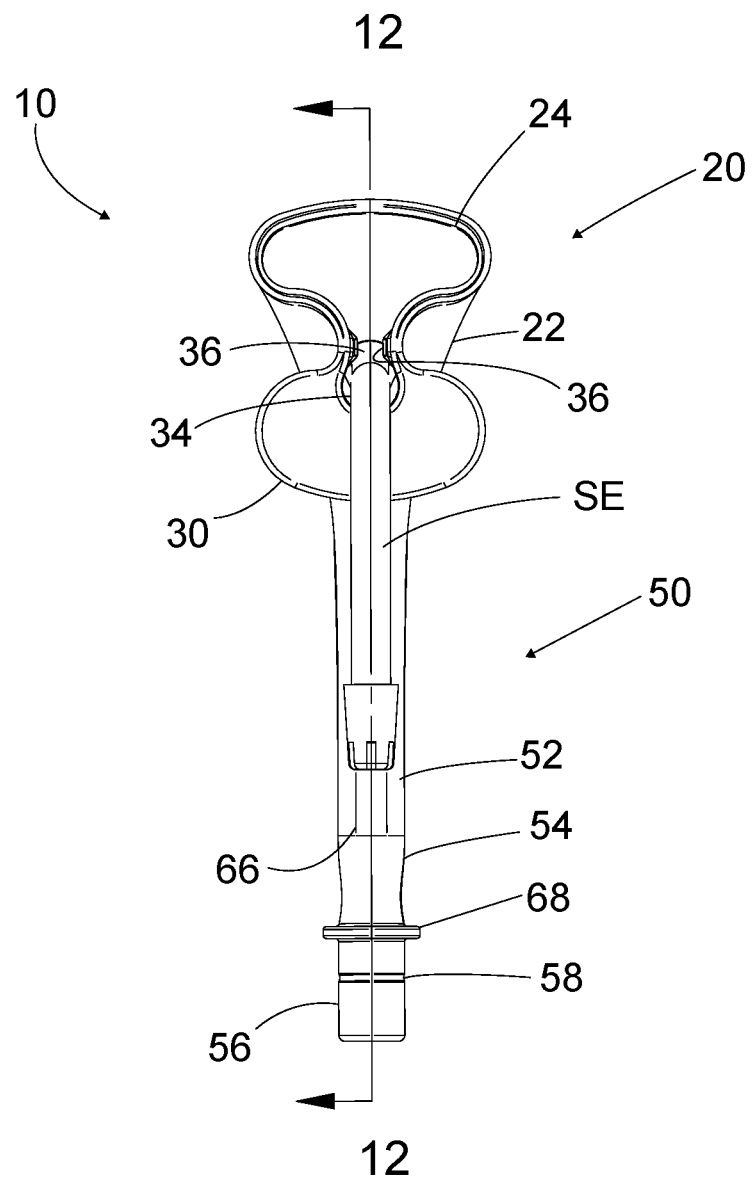
FIG. 11 is a front view of the device of the present invention having a saliva-ejector inside.
Figure 12:
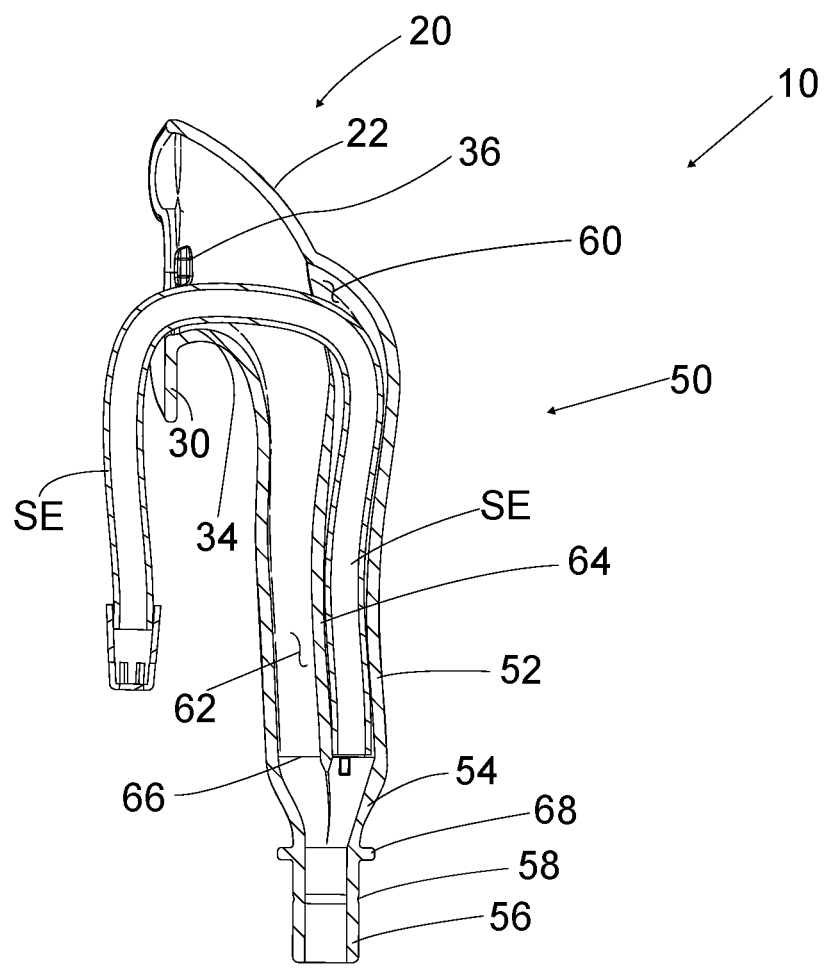
FIG. 12 is a cut view taken along line 12-12 from FIG. 11.
Figure 13:
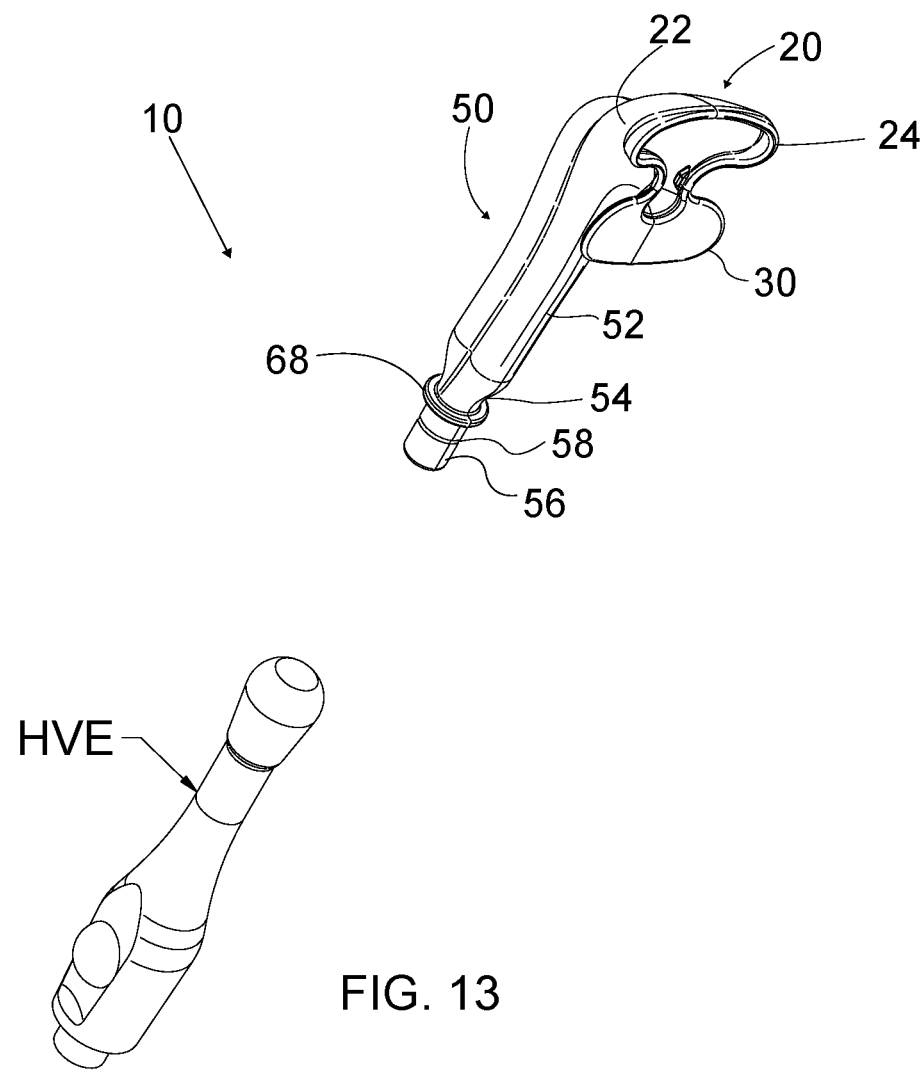
FIG. 13 is an isometric view of the device of the present invention and a High Volume Evacuator.
Figure 13:
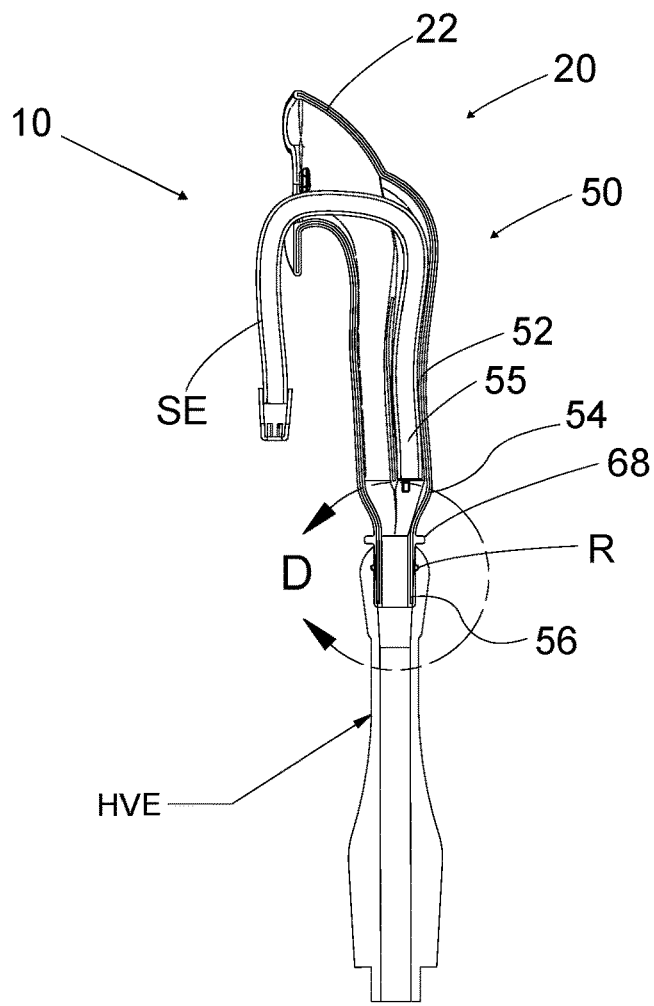
Figure 13:
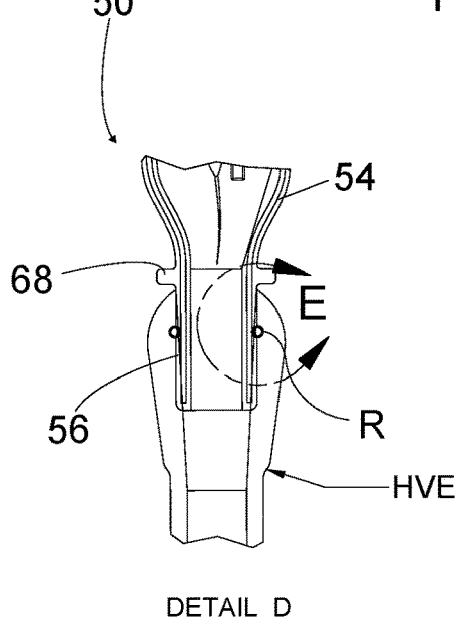
Figure 13:
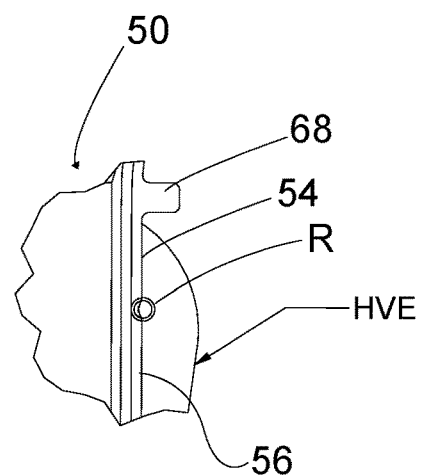

As seen in FIGS. 11 and 12 first passage 60 receives saliva-ejector SE. Saliva-ejector SE passes through first passage 60 and extends outwardly from aerosol removal port 20. In a preferred embodiment, saliva-ejector SE passes through opening lower portion 34 and extends outwardly from aerosol removal port 20. First and second tabs 36 secure saliva-ejector SE on opening lower portion 34. Saliva-ejector SE is disposable. A saliva ejector guide moves a disposable saliva ejector SE to opening lower portion 34 to initiate suction.

As seen in FIGS. 13, 13A, 13B, and 13C, High Volume Evacuator HVE is connected to High Volume Evacuator connector 56. Back flow union 54 comprises ridge 68. Back flow union 54 prevents back flow by allowing a continuous suction to occur. In a preferred embodiment, High Volume Evacuator HVE is positioned below ridge 68, whereby ridge 68 acts as a stopper of High Volume Evacuator HVE. Aerosol assist body assembly 50 defines channel 58. In a preferred embodiment, channel 58 receives ring R of High Volume Evacuator HVE to secure High Volume Evacuator HVE on High Volume Evacuator connector 56. Hose length adjustor 55 (seen in FIG. 13A) tapers and allows the saliva ejector SE length to be changed within a five-millimeter (5 mm) range. The hose length can be changed in this range without losing suction to accommodate variances in anatomy. High Volume Evacuator connector 56 accepts a standard saliva ejector SE.

Figure 14:
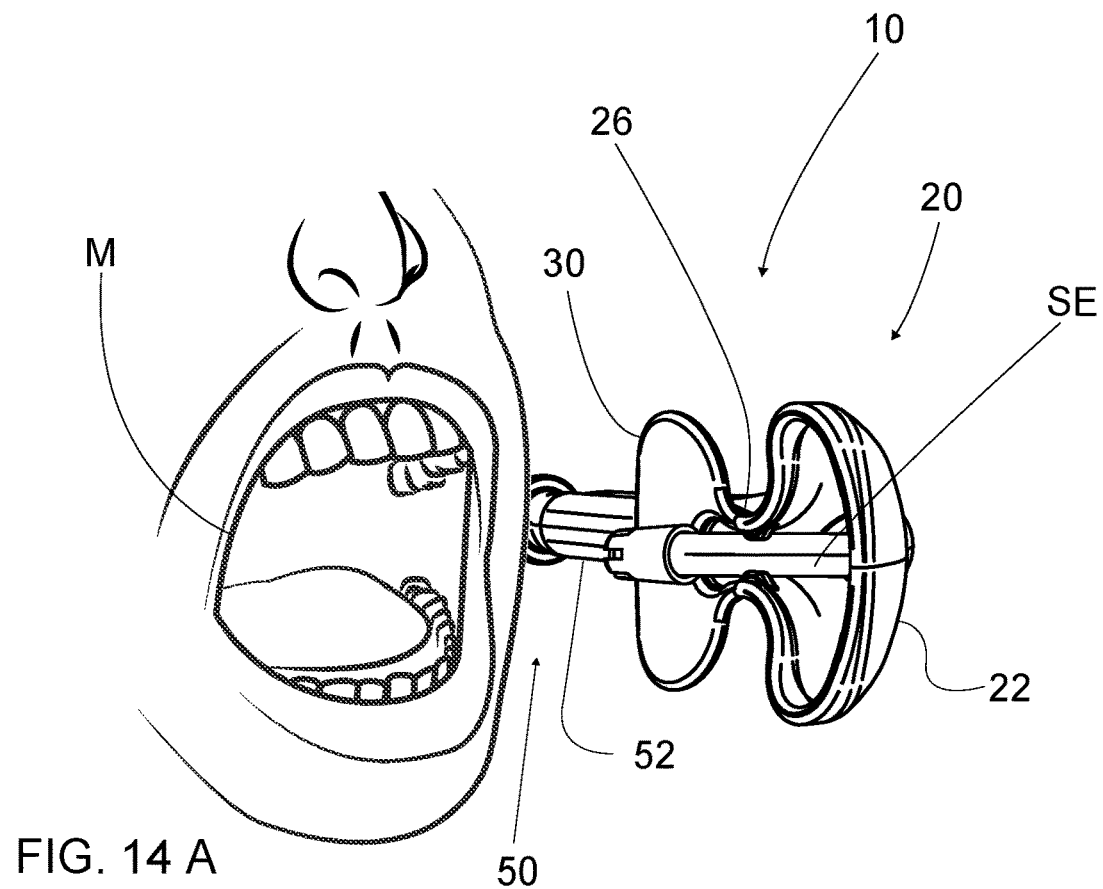
FIG. 14A is an isometric view of the device of the present invention being inserted into a mouth of a patient.
FIG. 14B is an isometric view of the device of the present invention inserted into the mouth of the patient.
Figure 14:
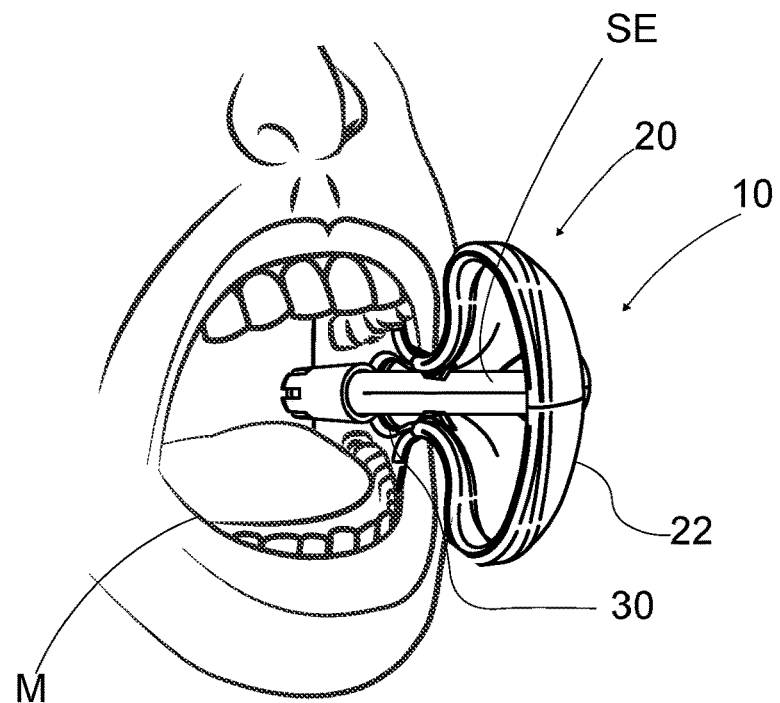

As seen in FIGS. 14A and 14B, aerosol and fluids are sucked from a patient's mouth M through first and second passages 60 and 62, seen in FIG. 8. Present invention 10 is a suctioning device to reduce aerosol dispersion and remove intraoral fluid from mouth M.

Present invention 10 provides a device for reducing aerosols and removing intraoral fluid that overcomes the disadvantages of the devices of this general type and of the prior art. A primary function of the Aerosol Assist or present invention 10, which is a suction device, is to assist the practitioner in removal of aerosols. Further objects of the invention include the following: (1) reducing the aerosol dispersion; (2) removing intraoral fluid; and (3) reducing fatigue of the practitioner due to non dominant hand by relieving a practitioner from holding the High Volume Evacuator HVE.

Dentistry is currently the most at risk profession. To reduce that risk, aerosol assist or present invention 10 minimizes aerosols, which contain airborne diseases and infections such as Covid-19 and other pathogens and impurities such as mercury fumes.

Minimizing aerosols increases practitioner safety, patient safety, and staff safety. The aerosol assist solves this issue because it possesses an external air intake manifold that aids in the removal of aerosols that are generated during procedures. The aerosol assist is positioned extra orally on the non-working side of the mouth to minimize visualization without the need of third-party systems. The aerosol assist reduces fatigue for the dentist and/or a dental assistant while in use, as it is hands-free. Other features that are considered as characteristic for the invention are set forth in the appended claims.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A device for reducing aerosols and removing intraoral fluid, comprising:
   A) an aerosol removal port having an aerosol removal port wall, an anchor, an aerosol entrance port rim, and a lip constriction;
   said lip constriction defines a waist on said aerosol entrance port rim with an opening upper portion and an opening lower portion;
   further characterized in that first and second tabs extends one in front of another from respective internal walls of said lip constriction, and
   B) an aerosol assist body assembly having a body wall and first and second passages separated by an internal wall, whereby said first passage receives a saliva-ejector, said aerosol assist body assembly extends perpendicular from said aerosol removal port.

2. The device for reducing aerosols and removing intraoral fluid set forth in claim 1, further characterized in that said opening upper portion comprises a first predetermined size and said opening lower portion comprises a second predetermined size, wherein said first predetermined size is larger than said second predetermined size.

3. The device for reducing aerosols and removing intraoral fluid set forth in claim 1, further characterized in that said lip constriction extends on said aerosol removal port wall from said aerosol entrance port rim toward said body wall.

4. The device for reducing aerosols and removing intraoral fluid set forth in claim 1, further characterized in that said anchor extends below said lip constriction.

5. The device for reducing aerosols and removing intraoral fluid set forth in claim 1, further characterized in that said anchor comprises a lip anchor.

6. The device for reducing aerosols and removing intraoral fluid set forth in claim 5, further characterized in that said lip anchor is defined between a backside of said lip anchor and said body wall.

7. The device for reducing aerosols and removing intraoral fluid set forth in claim 5, further characterized in that said aerosol removal port is narrower from said lip constriction to said anchor.

8. The device for reducing aerosols and removing intraoral fluid set forth in claim 1, further characterized in that said aerosol assist body assembly further comprises a back flow union, a High Volume Evacuator connector, a body end, and a channel.

9. The device for reducing aerosols and removing intraoral fluid set forth in claim 8, further characterized in that said back flow union comprises a ridge.

10. The device for reducing aerosols and removing intraoral fluid set forth in claim 8, further characterized in that said back flow union is connected to said body wall at said body end, said High Volume Evacuator connector is connected to said back flow union, and a High Volume Evacuator is connected to said High Volume Evacuator connector.

11. The device for reducing aerosols and removing intraoral fluid set forth in claim 1, further characterized in that said saliva-ejector passes through said first passage and extends outwardly from said aerosol removal port.

12. The device for reducing aerosols and removing intraoral fluid set forth in claim 1, further characterized in that said saliva-ejector passes through said opening lower portion extending outwardly from said aerosol removal port.

13. The device for reducing aerosols and removing intraoral fluid set forth in claim 1, further characterized in that said first and second tabs secure said saliva-ejector on said opening lower portion.

14. The device for reducing aerosols and removing intraoral fluid set forth in claim 1, further characterized in that through first and second passages, aerosol and fluids are suctioned from a patient's mouth.

15. The device for reducing aerosols and removing intraoral fluid set forth in claim 1, further characterized in that said device is a suction device to reduce aerosol dispersion and removing intraoral fluid.

* * * * *